United States Patent [19]

Chiu-Hao

[11] Patent Number: 5,996,033
[45] Date of Patent: Nov. 30, 1999

[54] DATA COMPRESSION DEVICE COMPRISING INPUT CONNECTOR FOR CONNECTING TO GAME PLAYER SYSTEM, OUTPUT CONNECTOR FOR CONNECTING TO MEMORY CARD, AND VIRTUAL MEMORY PAGE SWITCH

[76] Inventor: Cheng Chiu-Hao, No. 44, Chung Cheng Rd., Yuan Li Town, Miao Lih Hsien, Taiwan

[21] Appl. No.: 08/923,606

[22] Filed: Sep. 4, 1997

[51] Int. Cl.[6] ....................................................... G06F 5/01
[52] U.S. Cl. ................... 710/68; 463/1; 463/35; 463/44; 463/45; 710/2; 710/65; 710/74
[58] Field of Search ............................ 345/115; 348/231; 358/402; 382/276; 463/1, 35, 44, 45; 710/2, 65, 68, 74

[56] References Cited

U.S. PATENT DOCUMENTS

| | | | |
|---|---|---|---|
| 4,386,773 | 6/1983 | Bronstein | 463/44 |
| 4,485,457 | 11/1984 | Balaska et al. | 463/45 |
| 5,095,798 | 3/1992 | Okada et al. | 463/35 |
| 5,710,572 | 1/1998 | Nihei | 345/115 |
| 5,724,155 | 3/1998 | Saito | 358/402 |
| 5,790,712 | 8/1998 | Fandrianto et al. | 382/276 |
| 5,821,997 | 10/1998 | Kawamura et al. | 348/231 |
| 5,823,871 | 10/1998 | Shiau | 463/1 |

*Primary Examiner*—Thomas C. Lee
*Assistant Examiner*—Chen Yuan
*Attorney, Agent, or Firm*—Bacon & Thomas

[57] ABSTRACT

A data compression device includes a data compression circuit for compressing data being transferred between a TV game player and a memory card, and for decompressing data sent from the memory card to the game player. The device is arranged to be inserted into the card receptacle of the TV game player, and includes an opening for receiving the memory card, thereby serving as an adapter between the game player and the memory card.

3 Claims, 3 Drawing Sheets

DATA COMPRESSION DEVICE COMPRISING INPUT CONNECTOR FOR CONNECTING TO GAME PLAYER SYSTEM, OUTPUT CONNECTOR FOR CONNECTING TO MEMORY CARD, AND VIRTUAL MEMORY PAGE SWITCH

FIELD OF THE INVENTION

The present invention is related to a data processing device used to compress data on a memory card. Duplicate data within a memory card is compressed without distortion and may be stored in a smaller space, thus enabling the memory card to store much more data.

DESCRIPTION OF THE PRIOR ART

Presently in the market, a nonstandard memory card with a data compression function is being sold. This cheap memory card requires less memory chips because of its a data compression circuit. The disadvantage thereof is that the data compression circuit only provides the functions of compressing data for the memory chips on a particular card.

SUMMARY OF THE INVENTION

The memory card adapter of the present invention is a device dedicated for use with a TV game player for storing game process and game data.

Accordingly, in the present invention the data compression circuit of the compression type memory card has been separated from the memory card. The compression function is performed by the device for multiple memory cards so that the capacity of the memory cards is increased. The efficiency of memory cards in the present invention may at least be doubled, and even increased as much as five times, depending on the capability of the data compression circuit and the stored data's ability to be duplicated.

The main objective of the present invention is to provide a data processing device to enlarge the storage volume of a memory card.

BRIEF DESCRIPTION OF THE DRAWINGS

The present invention will be better understood and its numerous objects and advantages will become apparent to those skilled in the art by referencing the following drawings in which.

DESCRIPTION OF THE PREFERRED EMBODIMENT

Figure 1:
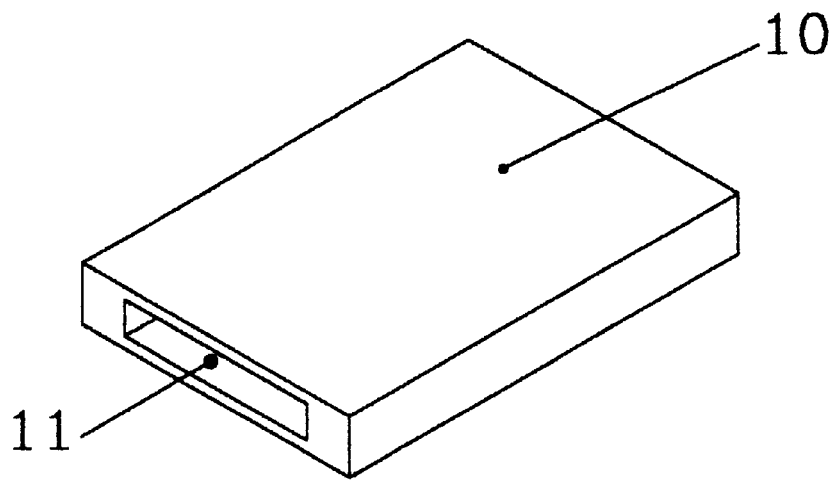
FIG. 1 is a schematic view of the appearance of a memory card.

Referring to FIG. 1, the structure of a memory card which may be used with the present invention is comprised of a body (10) which contains a memory chip for storing data; and an input connector opening (11) containing an electrical connector for connecting to the memory card receptacles (31) and (32) of the TV game player(30), so as to attain the object of accessing the data within the memory card (10).

Figure 2:
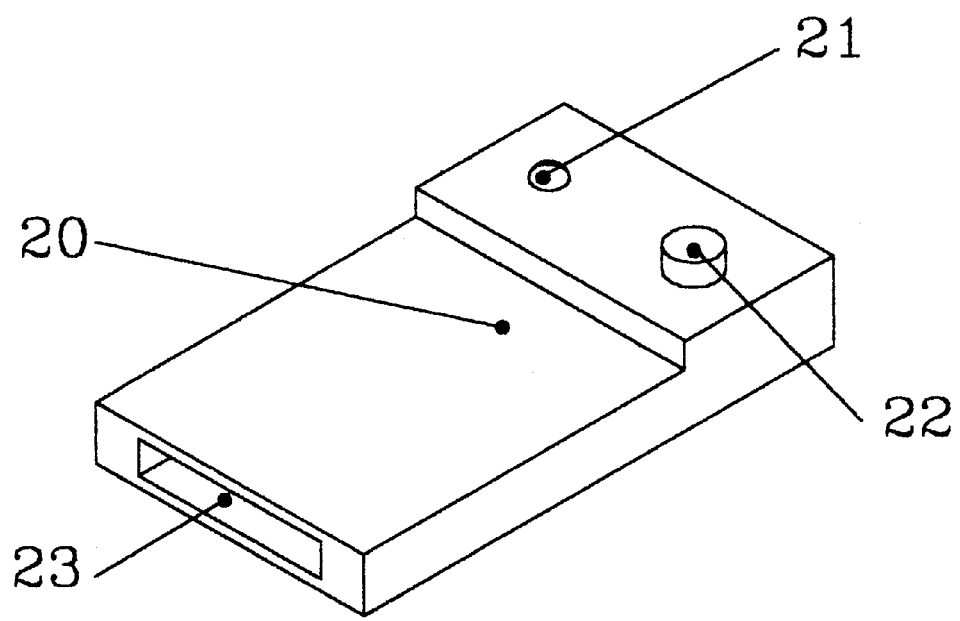
FIG. 2 is a schematic view of the appearance of a compression type memory card.

Referring to the compression type memory card (20) shown in FIG. 2, the structure thereof is comprised of an input connecting opening (23) containing an electrical connector for connecting to the memory card receptacles (31) and (32) of the TV game player (30), so as to attain the object of accessing the data within the memory card (20); The memory card contains compression circuits and memory chips for storing data; a switch (22) for switching the virtual page of a memory to accomodate some TV game player systems in which it is impossible to access a memory space which exceeds the constant volume of the memory card. Thus, this switch is used to switch the memory space in said compression memory card (20) to obtain more memory space. Also included is a display lamp (21) for displaying the used memory virtual page to prevent the user from being unaware of which page is switched.

Figure 3:
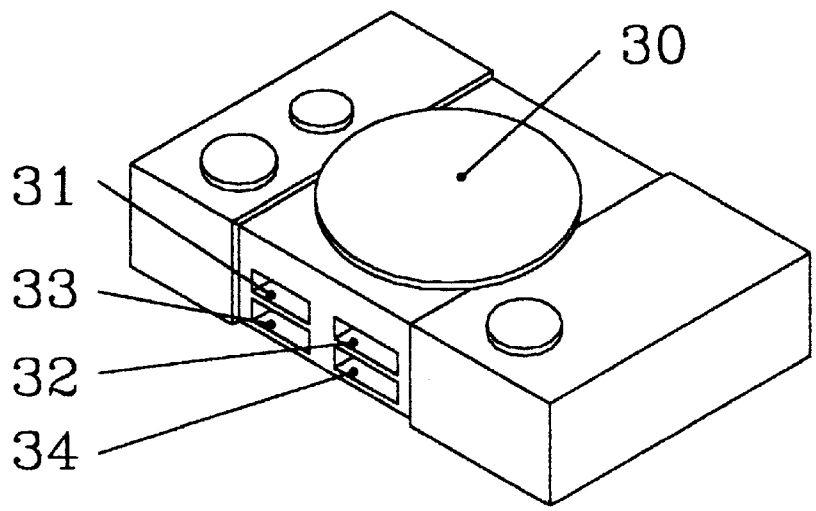
FIG. 3 is a schematic view of the appearance of a TV game player.

FIG. 3 shows the appearance of a conventional TV game player.

Figure 4:
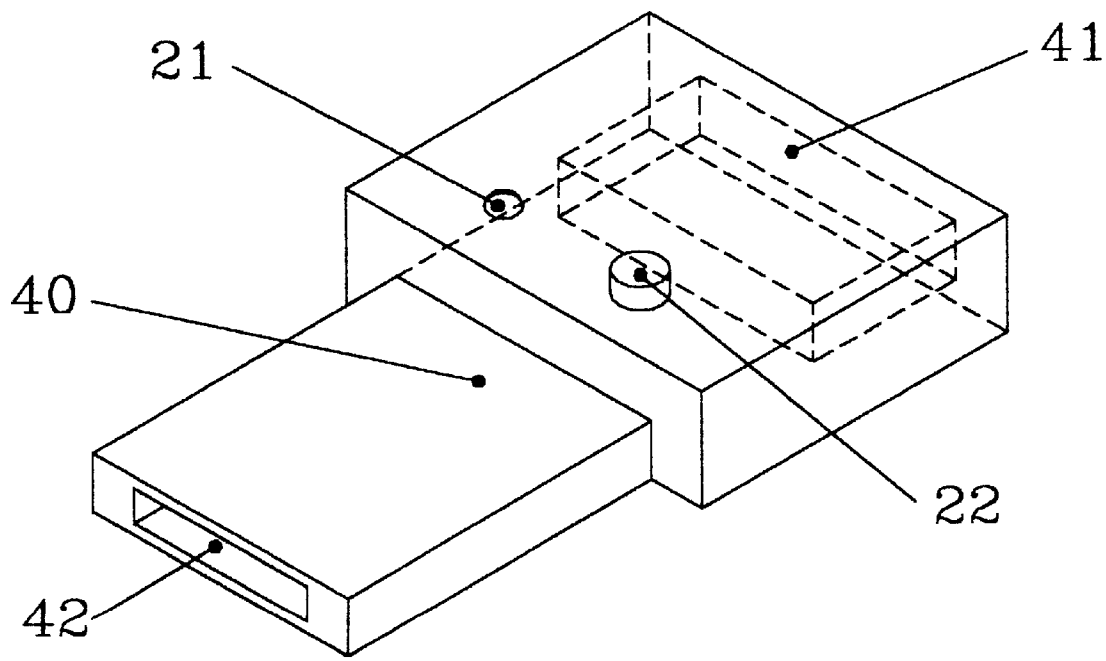
FIG. 4 is a schematic view of the appearance of the data processing device of the present invention.

The data processing device (40) of the present invention shown in FIG. 4 is used as follows, the input connecting opening (42) of the device (40) is inserted into memory card receptacles (31) and (32), and then the input connecting opening (11) of the memory card (10) is inserted into an output connector opening (41). The device (40) includes a data compression circuit therewithin for compressing the data inputted from the input connector included in opening (42) in order to transfer it to the output connector including in opening (41) or decompress the data inputted from the output connector in order to transfer it to the input connector, as well as; a switch (22) for switching a memory virtual page, and a display lamp (21) for displaying the memory virtual page to be used. As those skilled in the art will appreciate, the data processing device divides the memory space of memory card into several banks. Each bank or so-called virtual memory page stores the compressed data, which corresponds to all the data stored in a common uncompressed memory card. Thus, the data processing device (40) of the present invention may be used to compress the data of the memory card (10) without confining the times of compression. Therefore, the effect of enlarged data storing capacity is attained.

Figure 5:
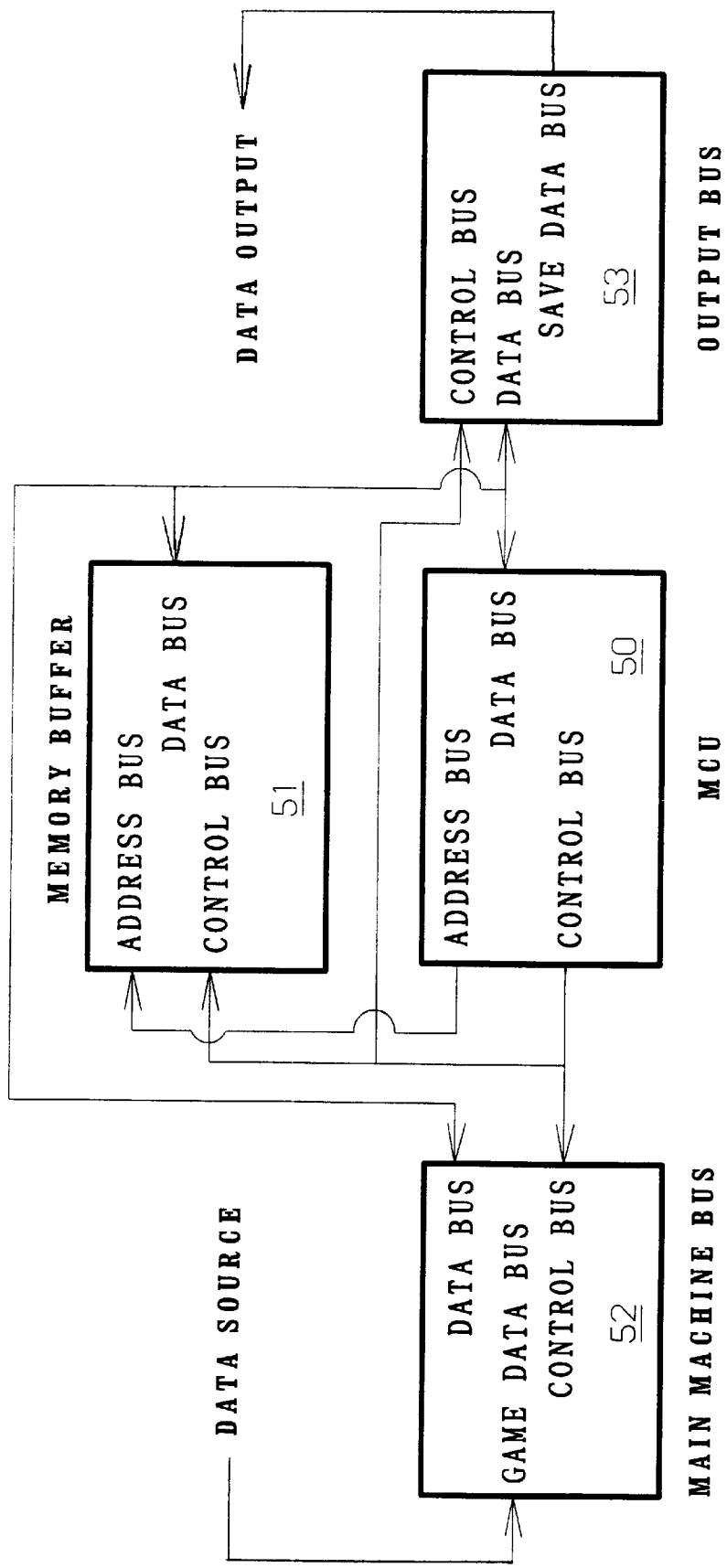
FIG. 5 is a circuit block diagram of the data processing device of the present invention.

FIG. 5 shows the block diagram of the data processing device circuit which is comprised of a buffer (51) for storing temporarily the compressed or decompressed data; an input data interface (52) for reading or writing data transmitted between the data processing device (40) and the TV game player; an output data interface (53) for reading or writing data transmitted between the data processing device (40) and the memory card (10); a microprocessor (50) for compressing or decompressing processed data and controlling another three circuits.

In the aforementioned description, a TV game player system, such as the Sony Play Stations®, is used to describe the embodiment of the present invention. However, the system, as observed by those skilled in the art, is not used to confine the present invention. For example, the Nintendo 64®, SEGA® station, and other TV game players or video playing machines may also be used with the present invention.

| Description of the numerals in the Figures | |
|---|---|
| 10 | memory card body |
| 11 | input connecting hole |
| 20 | compression type memory card body |

-continued

| | Description of the numerals in the Figures |
|---|---|
| 21 | display lamp |
| 22 | switch |
| 23 | input connecting hole |
| 30 | TV game player |
| 31, 32 | receptacle of a memory card |
| 33, 34 | receptacle of a game handle |
| 40 | data processing device body |
| 41 | output connecting hole |
| 42 | input connecting hole |
| 50 | microprocessor |
| 51 | buffer |
| 52, 53 | data interface |

Claimed is:

1. A data compression device for a TV game player system, comprising:
 a body containing:
  an input opening containing an input connector arranged to be inserted into a memory card receptacle of a TV game player;
  a data compression circuit;
  a memory buffer;
  an output opening containing an output connector arranged to receive a TV game player memory card;
  a switching means arranged to switch a virtual memory page of said memory card; and
  a display means arranged to display a virtual memory page number of said virtual memory page,
 wherein said data compression circuit is arranged to receive data from said TV game player through said input connector, to store the received data in said data buffer, to compress said received data and to transfer the compressed data to the virtual memory page of said memory card through said output connector, said virtual memory page being denoted by said manual switching means, and
 wherein said data compression circuit is further arranged to receive the compressed data from said memory card through said output connector, to decompress said compressed data, to store the decompressed data in said data buffer, and to transfer said decompressed data through said input connector to said TV game player.

2. A data compression device as claimed in claim 1, wherein said switching means is a manual switch mounted on said body.

3. A data compression device as claimed in claim 1, wherein said display means is a display lamp mounted on said body.

* * * * *